United States Patent
Nakagawa et al.

(10) Patent No.: US 9,210,922 B2
(45) Date of Patent: Dec. 15, 2015

(54) DUAL-BEARING REEL

(71) Applicant: Shimano Inc., Sakai, Osaka (JP)

(72) Inventors: Shouji Nakagawa, Osaka (JP); Tomoya Deguchi, Osaka (JP); Kunio Takechi, Osaka (JP)

(73) Assignee: Shimano Inc., Osaka (JP)

( * ) Notice: Subject to any disclaimer, the term of this patent is extended or adjusted under 35 U.S.C. 154(b) by 17 days.

(21) Appl. No.: 14/083,111

(22) Filed: Nov. 18, 2013

(65) Prior Publication Data

US 2014/0183293 A1 Jul. 3, 2014

(30) Foreign Application Priority Data

Dec. 28, 2012 (JP) ................................. 2012-286656

(51) Int. Cl.
*A01K 89/01* (2006.01)
*A01K 89/015* (2006.01)

(52) U.S. Cl.
CPC .................... *A01K 89/015* (2013.01)

(58) Field of Classification Search
USPC .................. 242/310, 312–315, 321
See application file for complete search history.

(56) References Cited

U.S. PATENT DOCUMENTS

| | | | | |
|---|---|---|---|---|
| 4,738,409 A | | 4/1988 | Sato | |
| 5,108,042 A | * | 4/1992 | Puryear et al. | 242/288 |
| 5,829,701 A | * | 11/1998 | Murayama et al. | 242/310 |
| 5,855,331 A | * | 1/1999 | Morimoto et al. | 242/310 |
| 5,988,548 A | * | 11/1999 | Chapman et al. | 242/310 |
| 6,016,982 A | * | 1/2000 | Asano et al. | 242/310 |
| 6,032,894 A | * | 3/2000 | Chapman et al. | 242/310 |
| 6,045,075 A | * | 4/2000 | Iwabuchi et al. | 242/279 |
| 6,409,113 B1 | | 6/2002 | Hirayama et al. | |
| 2002/0104911 A1 | * | 8/2002 | Nishimura | 242/310 |
| 2004/0075005 A1 | * | 4/2004 | Myojo et al. | 242/310 |
| 2005/0056716 A1 | * | 3/2005 | Kawasaki | 242/310 |
| 2005/0224617 A1 | | 10/2005 | Nakagawa et al. | |
| 2007/0181728 A1 | * | 8/2007 | Kawasaki | 242/310 |
| 2007/0246590 A1 | * | 10/2007 | Hyun | 242/310 |
| 2010/0038464 A1 | * | 2/2010 | Nakagawa | 242/321 |
| 2011/0240785 A1 | | 10/2011 | Martin et al. | |
| 2013/0153700 A1 | * | 6/2013 | Niitsuma et al. | 242/310 |

FOREIGN PATENT DOCUMENTS

| | | |
|---|---|---|
| JP | 11-113462 A | 4/1999 |
| JP | 2001-148975 A | 6/2001 |

OTHER PUBLICATIONS

European Search Report of corresponding EP Application No. 13 19 3147.9 dated Apr. 25, 2014.

* cited by examiner

*Primary Examiner* — Emmanuel M Marcelo
(74) *Attorney, Agent, or Firm* — Global IP Counselors

(57) ABSTRACT

A dual-bearing reel is attachable to a fishing rod and configured to forwardly reel out a fishing line in a forward direction. The dual-bearing reel includes a reel unit, a spool, a handle and an attaching member. The reel unit includes a first main body part and a second main body part. The first main body part includes a first lateral surface, a second lateral surface being opposite to the first lateral surface, and an attachment-side surface. The second main body part includes a third lateral surface facing the first lateral surface at a predetermined interval. The attaching member includes an attaching surface facing a first direction. The first main body part includes a recessed portion extending along a first boundary portion. The first boundary portion is between the attachment-side surface and the first lateral surface. The attachment-side surface faces the first direction.

8 Claims, 9 Drawing Sheets

DUAL-BEARING REEL

CROSS-REFERENCE TO RELATED APPLICATIONS

This application claims priority to Japanese Patent Application No. 2012-286656 filed on Dec. 28, 2012. The entirety disclosure of Japanese Patent Application No. 2012-286656 is hereby incorporated herein by reference.

BACKGROUND OF THE INVENTION

1. Field of the Invention

The present invention relates to a dual-bearing reel that is attachable to a fishing rod and is configured to forwardly reel out a fishing line.

2. Background Art

A dual-bearing reel generally includes a spool, a reel unit, and a handle. The reel unit includes first and second main body parts disposed for sandwiching a spool from both ends of the spool. The handle is attached to the first main body part. When the handle is rotated by an angler, the rotation of the handle is transmitted to the spool by a rotation transmission mechanism accommodated in the first main body part. The spool is thereby rotated. The rotation transmission mechanism includes a drive gear, a pinion gear, and a clutch mechanism. The drive gear is mounted onto a handle shaft. The pinion gear is mounted onto a spool shaft while being rotatable and axially movable. The pinion gear is also meshed with the drive gear. The clutch mechanism is configured to engage/disengage the handle and the spool. A fishing line can be reeled out of the spool or can be wound about the spool by operating the clutch mechanism (see e.g., Japan Laid-open Patent Application Publication No. JP-A-2001-148975).

In recent years, fishing reels have been demanded to speed up a gear ratio, i.e., increase the number of spool rotation per handle rotation. To meet the demand, the diameter of the pinion gear has been reduced, whereas the diameter of the drive gear has been increased. As a result, a tendency has been observed that the first main body part accommodating the drive gear is increased in its size.

SUMMARY

In some cases of fishing with a dual-baring reel, either the spool or a fishing rod is operated in so-called palming. Palming is an action of grasping the reel unit from the second main body part side opposite to the handle attached side. In palming, the reel unit is grasped together with the fishing rod by the hand opposite to the hand holding the handle (i.e., by the left hand when the dual-beating reel is of a right handle type). However, when the first main body part of the reel unit is increased in its size as described above, such a drawback that the fingertips of the hand grasping the reel unit interfere with the first main body part in palming exists. In other words, the fingertips make contact with a corner portion of the first main body part and thereby the reel unit cannot be easily grasped.

In view of the above, it is an advantage of the present invention to enable a reel unit to be easily grasped in palming.

A dual-bearing reel is attachable to a fishing rod and configured to forwardly reel out a fishing line in a forward direction. The dual-bearing reel includes a reel unit, a spool, a handle, and an attaching member. The reel unit includes a first main body part and a second main body part. The first main body part includes a first lateral surface, a second lateral surface being opposite to the first lateral surface, and an attachment-side surface. The second main body part includes a third lateral surface facing the first lateral surface at a predetermined interval. The spool is disposed between the first main body part and the second main body part. The handle is rotatably attached to the first main body part on the second lateral surface. The attaching member includes an attaching surface facing a first direction. The attaching surface contacts to the fishing rod when the dual-bearing reel is attached to the fishing rod. The first main body part includes a recessed portion extending along a first boundary portion. The first boundary portion is between the attachment-side surface and the first lateral surface. The attachment-side surface faces the first direction.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
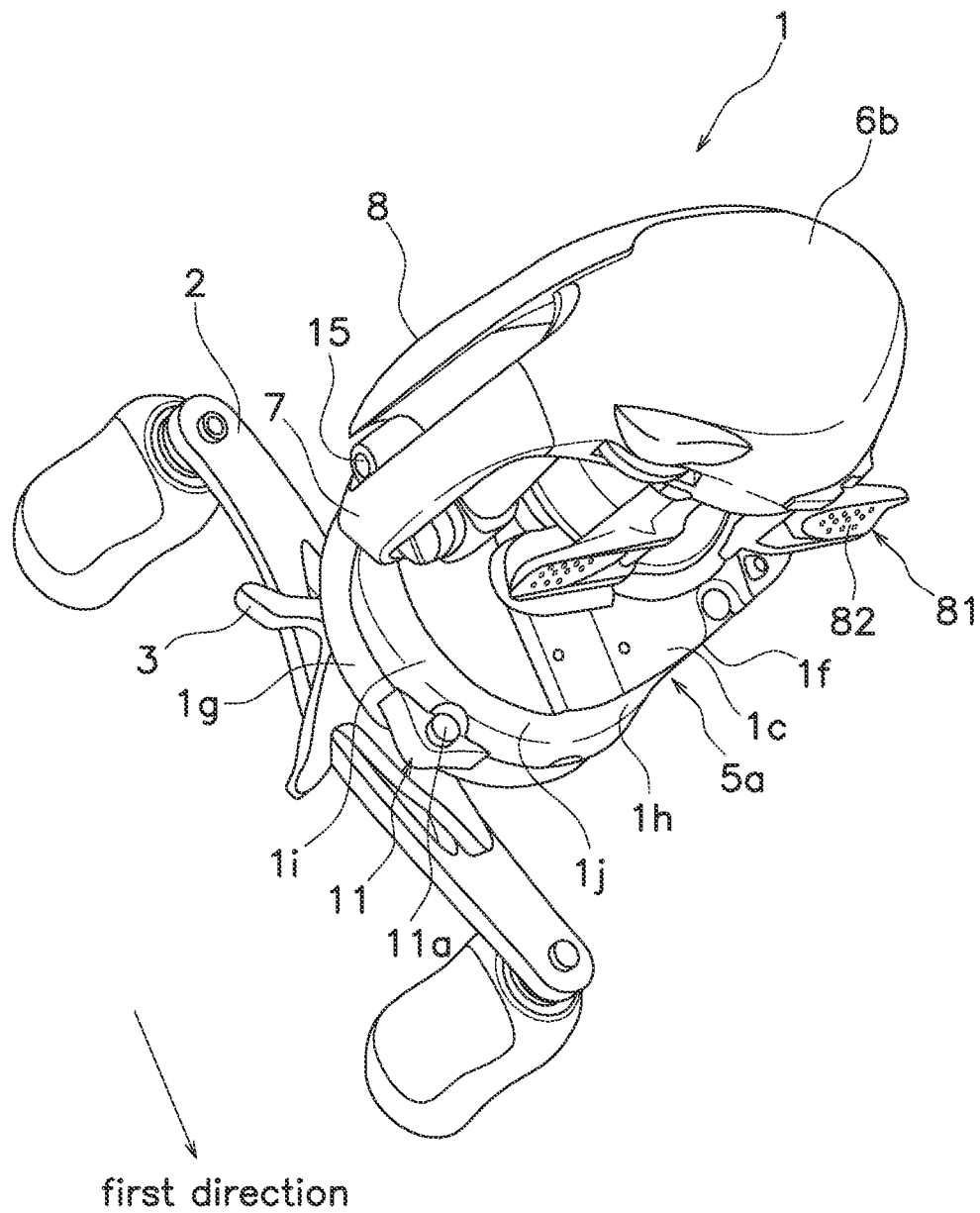
FIG. 1 is a perspective view of a dual-bearing reel employing an exemplary embodiment of the present invention.
Figure 2:
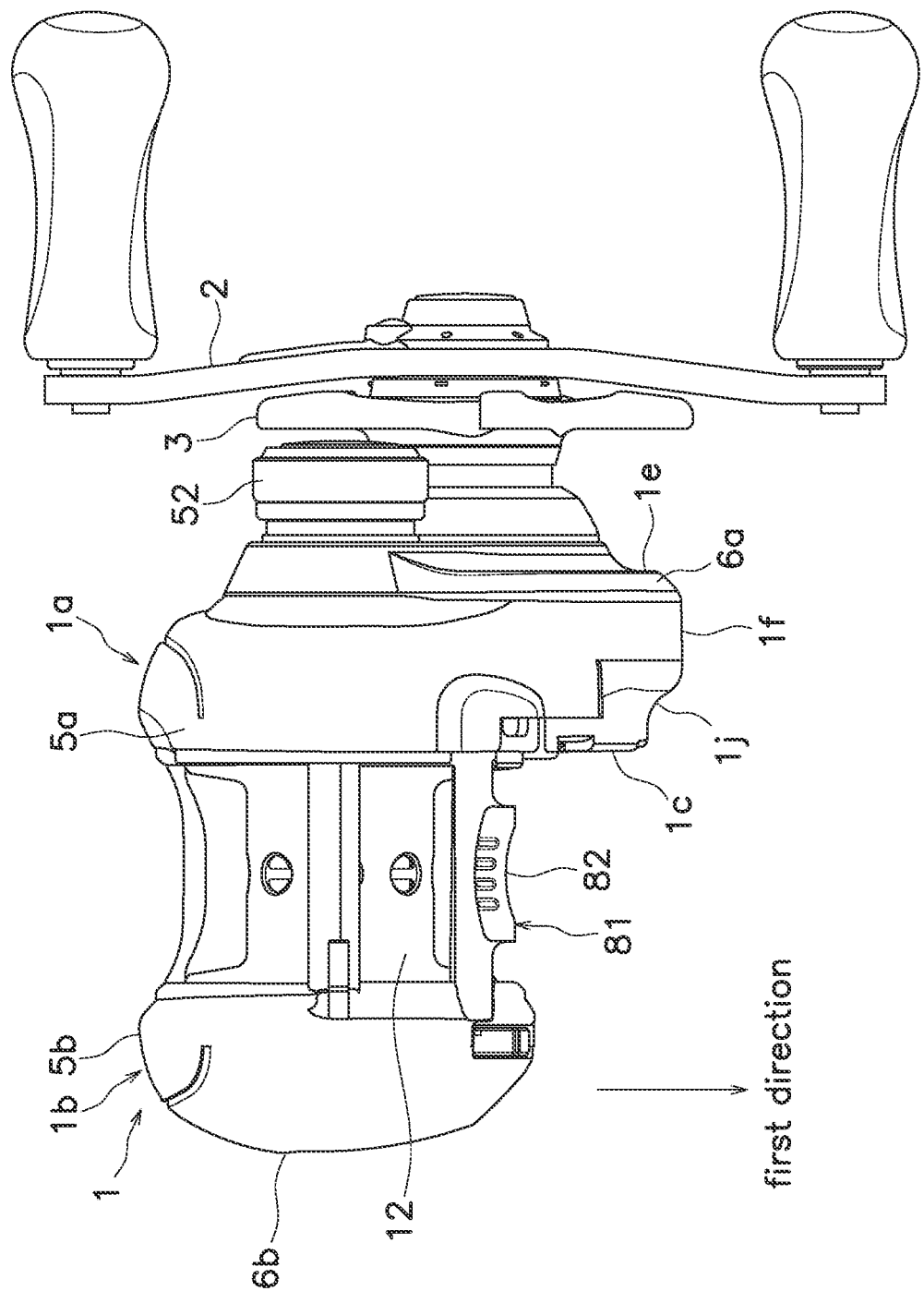
FIG. 2 is a rear view of the dual-bearing reel.

As illustrated in FIGS. 1 to 4, a dual-bearing reel employing a first exemplary embodiment of the present invention is a compact low-profile reel for bait-casting. The dual-bearing reel includes a reel unit 1, a handle 2 for spool rotation, and a star drag 3 for drag force regulation. The handle 2 is disposed laterally to the reel unit it. The star drag 3 is disposed on the reel unit 1 side of the handle 2. The dual-bearing reel further includes an attaching member 81. The attaching member 81 has an attaching surface 82 facing a first direction. The attaching surface 82 contacts to a fishing rod when the dual-bearing reel is attached to the fishing rod. The attaching member 81 extends between a first main body part 1a and a second main body part 1b described hereafter.

Reel Unit

Figure 5:
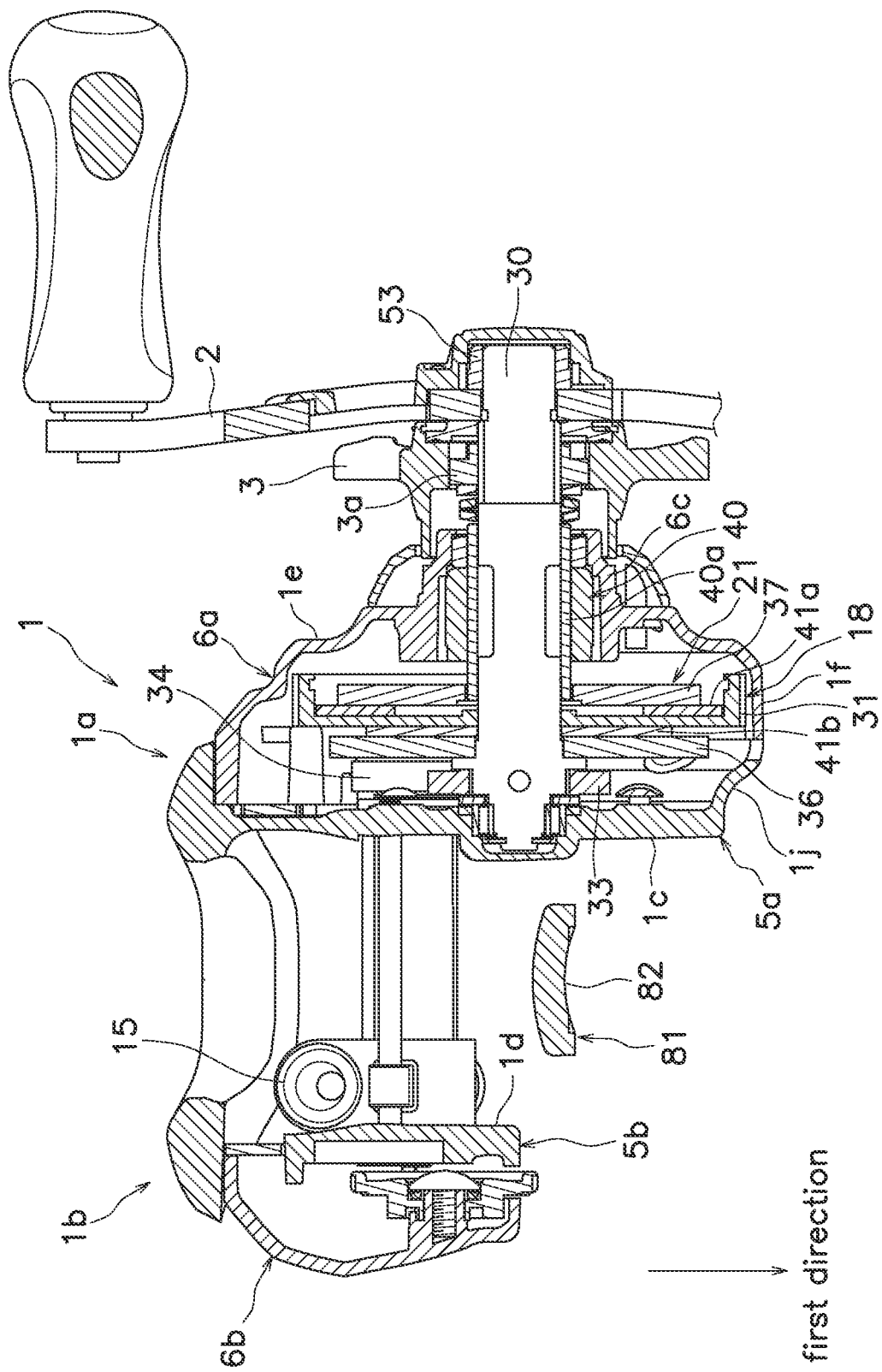
FIG. 5 is a cross-sectional view of the dual-bearing reel taken along a line Y-Y in FIG. 3.
Figure 6:
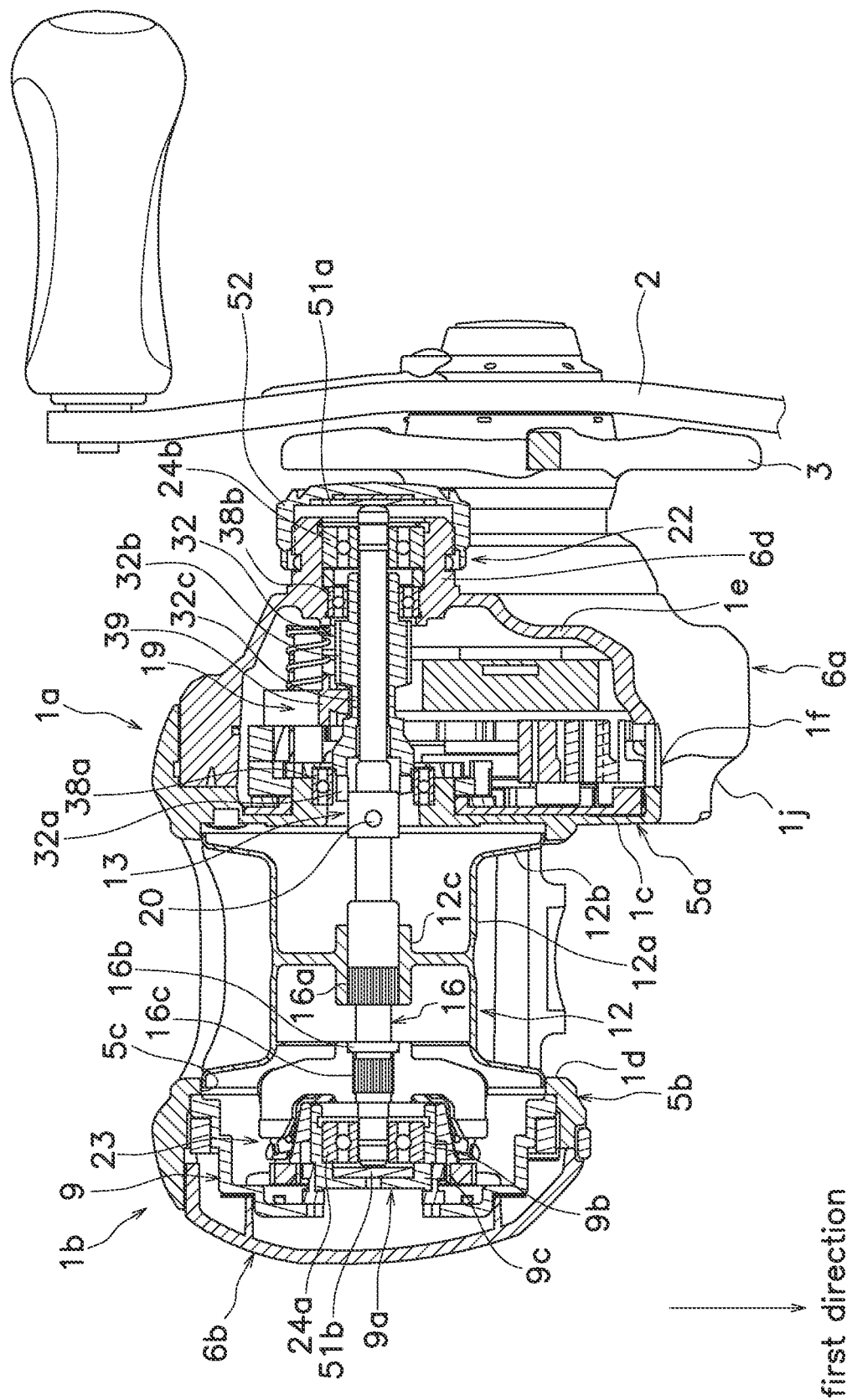
FIG. 6 is a cross-sectional view of the dual-bearing reel taken along a line R-R in FIG. 3.
Figure 7:
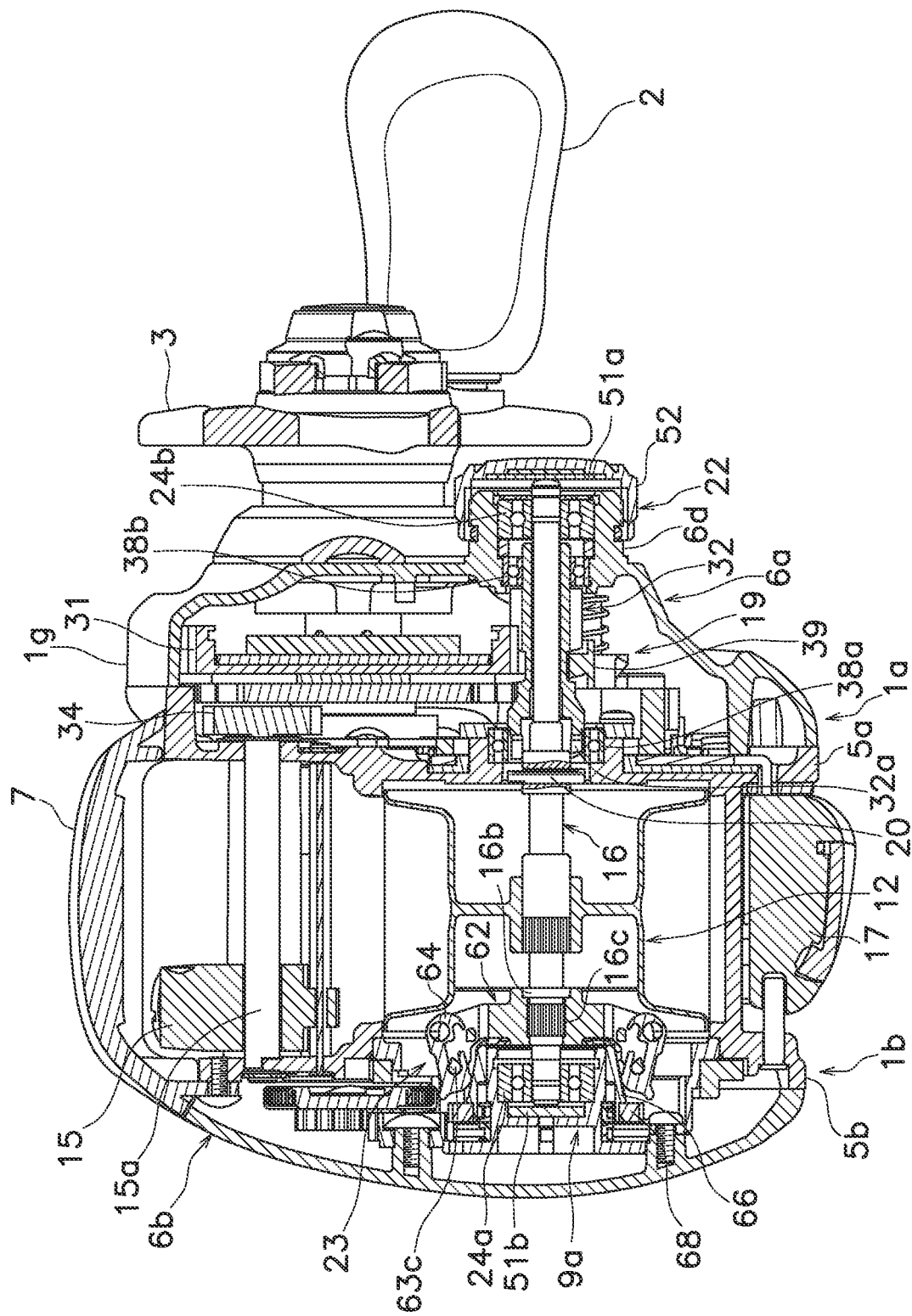
FIG. 7 is a cross-sectional view of the dual-bearing reel taken along a line Z-Z in FIG. 3.

As illustrated in FIGS. 5 to 7, the reel unit 1 includes the first main body part 1a and the second main body part 1b. A first lateral surface 1c of the first main body part 1a and a third lateral surface 1d of the second main body part 1b are disposed opposite to each other at a predetermined interval. The first main body part 1a includes a first side plate 5a and a first side cover 6a attached laterally to the first side plate 5a. On the other hand, the second main body part 1b includes a second side plate 5b and a second side cover 6b laterally attached to the second side plate 5b. It should be noted that the frame of the reel unit 1 is composed of the first side plate 5a, the second side plate 5b, and coupling portions (not illustrated in the figures) for coupling the first side plate 5a and the second side plate 5b.

Figure 3:
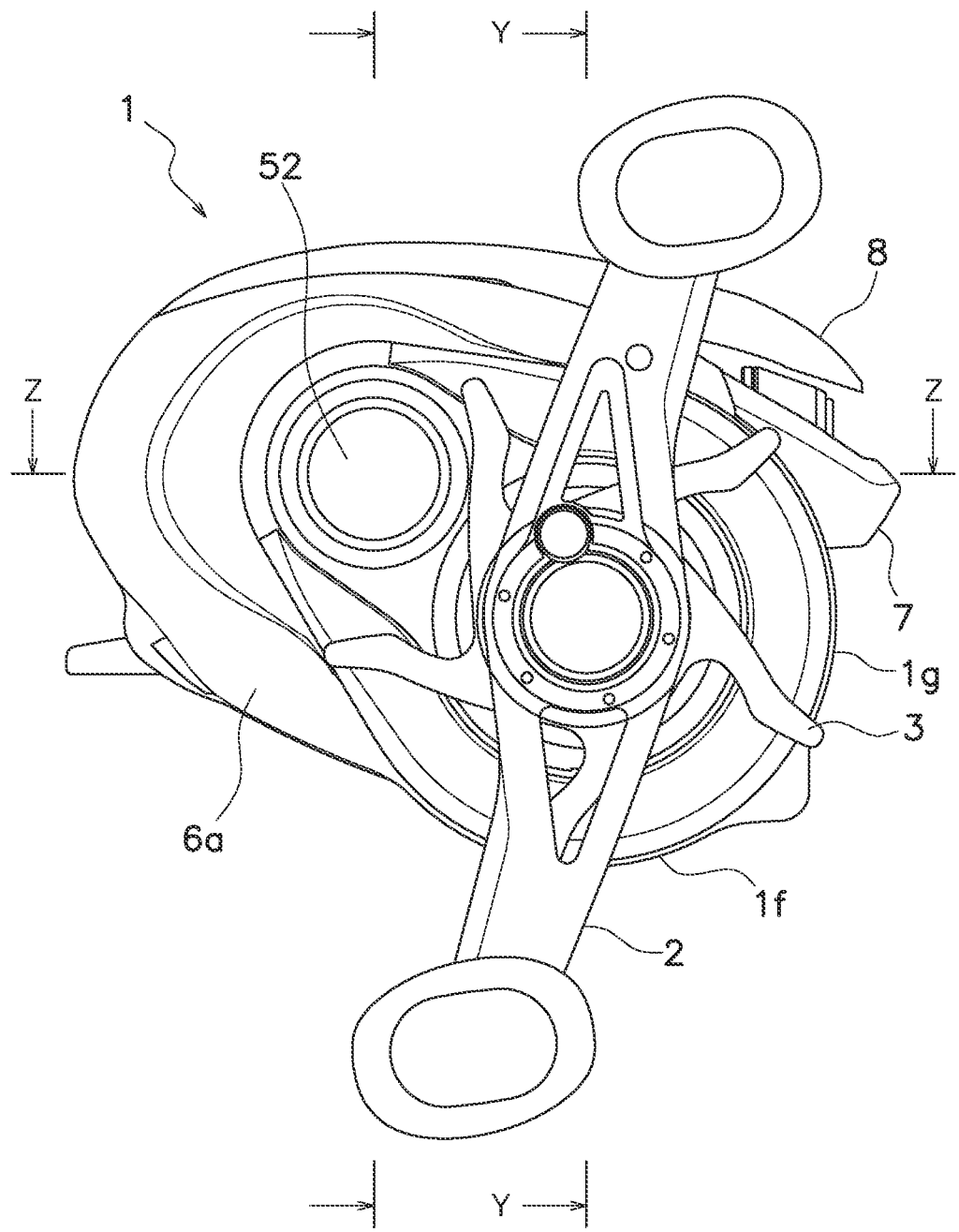
FIG. 3 is a right side view of the dual-bearing reel.
Figure 4:
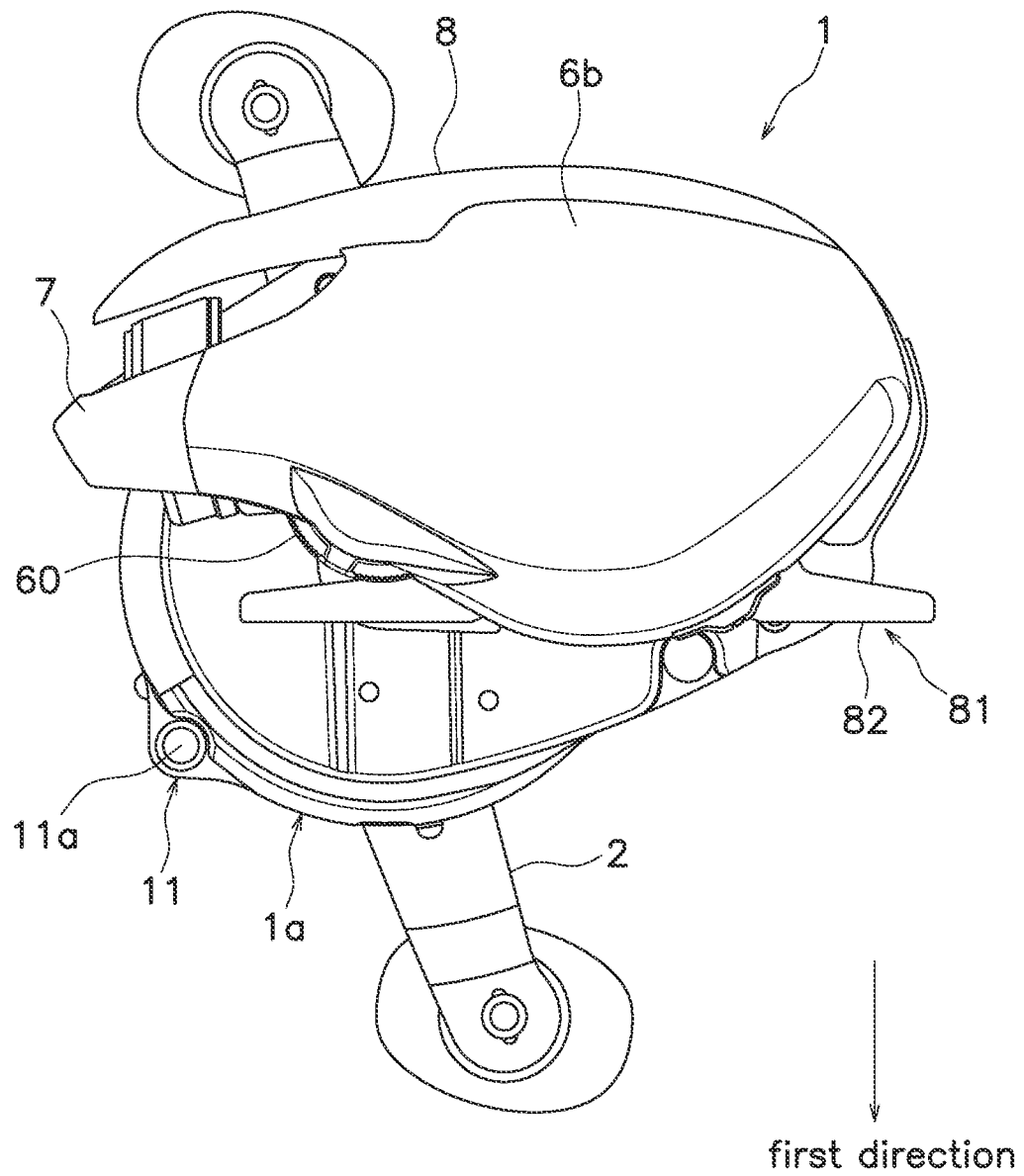
FIG. 4 is a left side view of the dual-bearing reel.

As illustrated in FIGS. 1, 3, and 4, the reel unit 1 further includes a front cover 7 and a thumb rest 8. The front cover 7 covers the front side of the reel unit 1, whereas the thumb rest 8 covers the top side of the reel unit 1. As illustrated in FIG. 6, the reel unit 1 further includes a shaft support part 9 fixed to the second side cover 6b by screws or the like. A spool 12 for winding a fishing line is rotatably and detachably mounted inside the reel unit 1, while being disposed between the first main body part 1a and the second main body part 1b.

As illustrated in FIGS. 1 to 4, the first main body part 1a has the first lateral surface 1c, a second lateral surface 1e, an attachment-side surface 1f, and a front surface 1g. The attachment-side surface 1f faces the first direction. The first main body part 1a has a recessed portion 1j continuously extending along a first boundary portion 1h and a second boundary portion 1i. The first boundary portion 1h is a boundary portion between the attachment-side surface 1f and the first lateral surface 1c. The second boundary portion 1i is a boundary portion between the front surface 1g and the first lateral surface 1e. The recessed portion 1j is formed on a part of the first boundary portion 1h, i.e., a part located forward of the spool shaft 16, while being formed on the entirety of the second boundary portion 1i.

The recessed portion 1j is formed by a curved surface. The recessed portion 1j has a roughly circular-arc shape in a cross-section taken along a direction perpendicular to the extending direction of the recessed portion 1j. The circular-arc of the recessed portion 1j preferably has a radius of curvature roughly in a range of greater than or equal to 3 mm and less than or equal to 15 mm, and more preferably, has a radius of curvature roughly in a range of greater than or equal to 5 mm and less than or equal to 10 mm. Through the application of the radius of curvature in the range, the fingertips of the hand grasping the reel unit 1 in palming can avoid interfering with the first boundary portion 1h formed as a corner portion of the first main body part 1a. It should be noted that the aforementioned cross-section of the recessed portion 1j cannot have a circular-arc shape having a single radius of curvature, and alternatively, can have any suitable shape formed by the combination of a plurality of circular-arcs respectively having radii of curvature in the aforementioned range. Further, the first boundary portion 1h and the second boundary portion 1i are portions that the fingertips of the hand grasping the reel unit 1 in palming can interfere.

The first side plate 5a and the second side plate 5b are coupled by a plurality of coupling portions (not illustrated in the figures). The second side plate 5b has a first opening 6c (see FIG. 6) for allowing the spool 12 to pass therethrough. Further, the second side plate 6b has another opening in the front lower part thereof. As illustrated in FIG. 4, the outer peripheral part of an operating member 60 is partially exposed through the latter opening. It should be noted that the operating member 60 is a member for regulating the braking force of a spool brake device 23.

The first side cover to is screwed to the first side plate 5a. The first side cover 6a has a first boss 6c (see FIG. 5) and a second boss 6d (see FIGS. 6 and 7). The first boss 6c is provided for supporting a drive shaft 30 to which the handle 2 is coupled. The second boss 6d is provided for supporting the spool shaft 16 to which the spool 12 is fixed.

As illustrated in FIG. 6, the shaft support part 9 is a closed-end tubular member. The shaft support part 9 has a tubular bearing accommodating portion 9a in the inner peripheral part thereof. The bearing accommodating portion 9a accommodates a first bearing 24a in the inside thereof. The first bearing 24a supports an end of the spool shaft 16. The bearing accommodating portion 9a has a first outer peripheral surface 9b and a second outer peripheral surface 9c. The first outer peripheral surface 9b is a large-diameter surface disposed on the spool 12 side, whereas the second outer peripheral surface 9c is a small-diameter surface disposed on the second side cover 6b side.

As illustrated in FIGS. 5, 6 and 7, the spool 12, a level winding mechanism 15, and a clutch operating member 17 are disposed inside the side plates 5a and 5b. The level winding mechanism 15 is a mechanism configured to uniformly wind the fishing line about the spool 12. The clutch operating member 17 functions as a thumb pad in thumbing the fishing line.

The spool 12 is allowed to pass through the first opening 5c of the second side plate 5b. Further, a gear mechanism 18, a clutch mechanism 13, a clutch control mechanism 19, a drag mechanism 21, and a casting control mechanism 22 are disposed between the first side plate 5a and the first side cover 6a. The gear mechanism 18 is a mechanism configured to transmit rotational force from the handle 2 to the spool 12 and the level winding mechanism 15. The clutch control mechanism 19 is a mechanism configured to engage/disengage and control the clutch mechanism 13 in response to the operation of the clutch operating member 17. The casting control mechanism 22 is a brake mechanism configured to regulate resistive force to be applied during rotation of the spool 12. Further, the spool brake device 23 is disposed between the second side plate 5b and the second side cover 6b. The spool brake device 23 is a device configured to inhibit occurrence of backlash in casting.

Spool and Spool Shaft

As illustrated in FIG. 6, the spool 12 is disposed between the first main body part 1a and the second main body part 1b. The spool 12 has a tubular bobbin trunk 12a, a pair of right and left flanges 12b, and a boss 12c. The bobbin trunk 12a is a part that the fishing line is wound about the outer periphery thereof. The flanges 12b are integrally formed on the both axial ends of the bobbin trunk 12a while being protruding radially outwards. The boss 12c is fixed onto the spool shaft 16 by an arbitrary fixation method such as press fitting. The spool 12 is thereby coupled to the spool shaft 16 while being unitarily rotatable therewith.

As illustrated in FIG. 6, the spool shaft 16 is extending outwards of the first side cover 6a while penetrating the first side plate 5a. One end of the spool shaft 16 is rotatably supported by the first bearing 24a accommodated in the bearing accommodating portion 9a of the shaft support part 9. On the other hand, the other end of the spool shaft 16 is rotatably supported by a second bearing 24b within the second boss 6d formed on the first side cover 6a. Thus, the spool shaft 16 is supported by the reel unit 1 through the bearings disposed in two positions.

An engaging pin 20, which forms a part of the clutch mechanism 13, is fixed to a part of the spool shaft 16, i.e., the part penetrating the first side plate 5a. The engaging pin 20 penetrates the spool shaft 16 along the radial direction, while the both ends thereof are radially protruding from the spool shaft 16. The spool shaft 16 has a first serration 16a on the outer peripheral surface thereof. Specifically, the first serration 16a is formed on a part to which the spool 12 is fixed. The first serration 16a functions as an anti-rotation element in fixing the spool 12 onto the spool shaft 16 by press-fitting. Further, the spool shaft 16 has a brimmed portion 16b. The brimmed portion 16b is provided for positioning a rotary member 62 of the spool brake device 23. The spool shaft 16 has a second serration 16c on the outer peripheral surface thereof. Specifically, the second serration 16c is formed on a part disposed on the second side cover 6b side of the brimmed portion 16b. The second serration 16c functions as an anti-rotation element in fixing the rotary member 62 onto the spool shaft 16 by press-fitting.

Gear Mechanism

As illustrated in FIG. 5, the gear mechanism 18 includes the drive shaft 30, a drive gear 31, a pinion gear 32 (see FIGS. 6 and 7), a first gear 33, and a second gear 34. The handle 2 is coupled to the drive shaft 30 while being unitarily rotatable therewith. The drive gear 31 is mounted to the drive shaft 30. The pinion gear 32 is meshed with the drive gear 31. The first gear 33 is coupled to the drive shaft 30 while being unitarily rotatable therewith. The second gear 34 is meshed with the first gear 33. The second gear 34 is provided for reciprocating the level winding mechanism 15 right and left in conjunction with the rotation of the handle 2.

Figure 8:
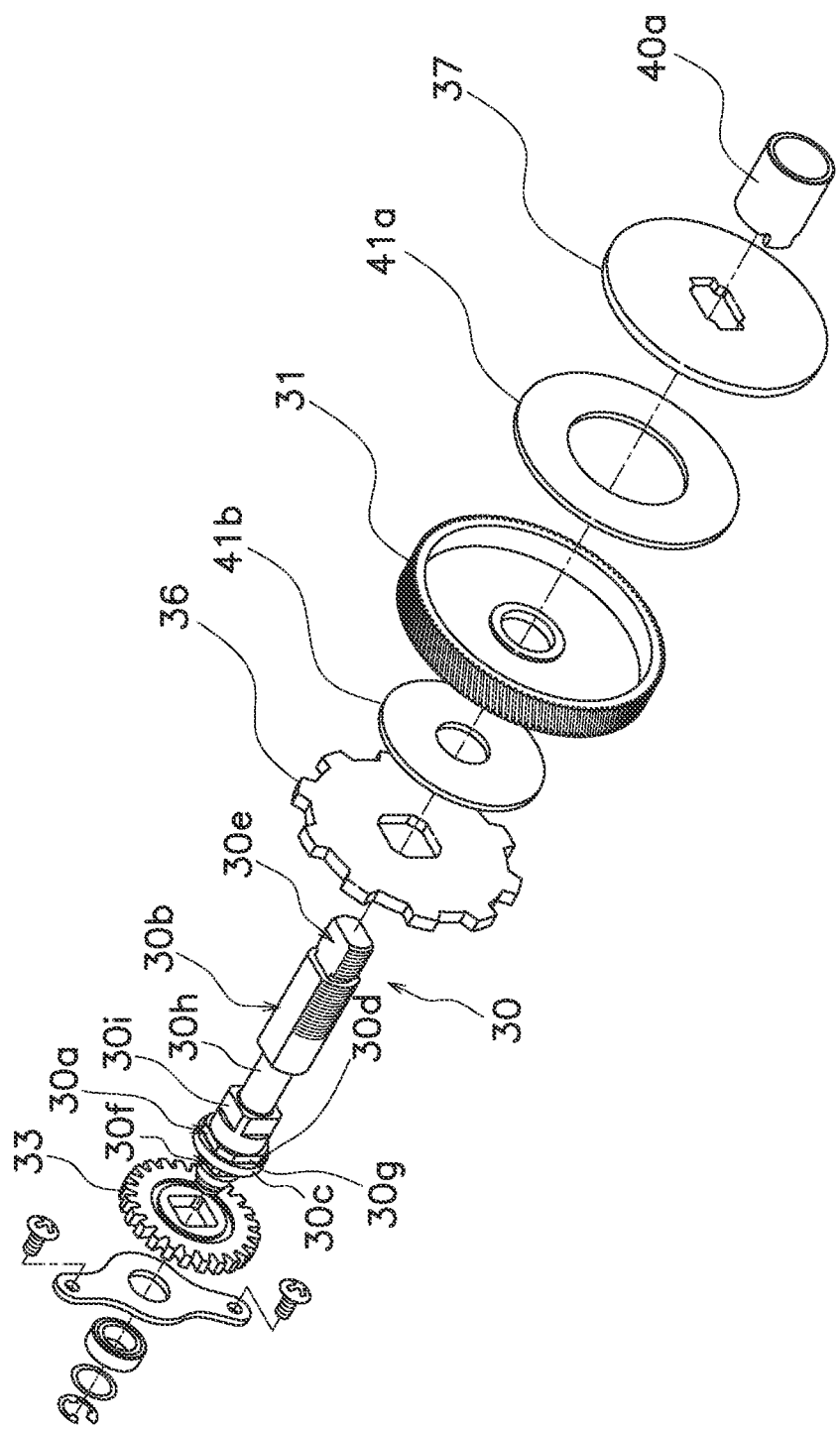
FIG. 8 is an exploded perspective view of a drive shaft and its peripheral components.

The drive shaft 30 is allowed to be rotated only in the fishing-line winding direction by a one-way clutch 40. As illustrated in FIG. 8, the drive shaft 30 has a first attachment portion 30a, a second attachment portion 30b, a brimmed portion 30c, and grooves 30d. The second attachment portion 30b is disposed adjacently to the first attachment portion 30a. The brimmed portion 30c is a large-diameter portion, and is disposed adjacently to the first attachment portion 30a while being disposed on the opposite side of the second attachment portion 30b through the first attachment portion 30a. The grooves 30d are formed on the brimmed portion 30c. The drive shaft 30 further has a third attachment portion 30e and a fourth attachment portion 30f. The handle 2 is mounted onto the third attachment portion 30e. The first gear 33 is mounted onto the fourth attachment portion 30f. In the present exemplary embodiment, the first attachment portion 30a has a diameter greater than that of the second attachment portion 30b.

A ratchet wheel 36, which functions as a drag receiver member for receiving the drag force of the drag mechanism 21, is mounted onto the first attachment portion 30a while being unitarily rotatable therewith. The ratchet wheel 36 is disposed between the drive gear 31 and the brimmed portion 30c. The first attachment portion 30a has four chamfered portions 30g on the outer peripheral surface thereof. The chamfered portions 30g serve to couple the ratchet wheel 36 thereto in a unitarily rotatable state. The ratchet wheel 36 functions not only as the drag receiver member but also as a clutch returning mechanism configured to return the clutch mechanism 13 from a clutch-off state to a clutch-on state. The four chamfered portions 30g of the first attachment portion 30a respectively have facets formed at 90-degree intervals along the circumferential direction.

As illustrated in FIG. 8, the drive gear 31 is rotatably mounted onto the second attachment portion 30b. Further, a drag plate 37 of the drag mechanism 21 is mounted to the second attachment portion 30b while being unitarily rotatable therewith. Yet further, a drag nut 3a (see FIG. 5) of the star drag 3 is screwed onto the second attachment portion 30b. The second attachment portion 30b has an annular thickness reduced portion 30h formed for reducing the weight of the drive shaft 30. Further, four chamfered portions 30i are axially formed with a predetermined length on the rear side (the left side in FIG. 8) of the thickness reduced portion 30h of the second attachment portion 30b. The drag plate 37 is coupled to the chamfered portions 30i while being unitarily rotatable therewith. The third attachment portion 30e is disposed on the tip end side of the second attachment portion 30b. The third attachment portion 30e has a diameter less than that of the second attachment portion 30b. The handle 2 is mounted onto the third attachment portion 30e while being unitarily rotatable therewith. Further, a nut 53 (see FIG. 5) is screwed onto the third attachment portion 30e in order to fix the handle 2 to the drive shaft 30. The fourth attachment portion 30f is disposed on the rear side (the left side in FIG. 8) of the brimmed portion 30c. The first gear 33 is mounted onto the fourth attachment portion 30f while being unitarily rotatable therewith.

As illustrated in FIGS. 6 and 7, the pinion gear 32 is a tubular member that the spool shaft 16 penetrates the center thereof. The pinion gear 32 is rotatably supported by the reel unit 1. Specifically, one end of the pinion gear 32 is rotatably supported by a sixth bearing 38a attached to the first side plate 5a, while the other end of the pinion gear 32 is rotatably supported by a seventh bearing 38b attached to the second boss 6d of the first side cover 6a.

Further, the pinion gear 32 is attached to the reel unit 1 while being movable in the spool shaft direction. The pinion gear 32 has an engaged groove 32a on one end thereof. The engaged groove 32a is engaged with the engaging pin 20. Further, the pinion gear 32 has gear teeth 32b on the other end portion thereof. The gear teeth 32b are meshed with the drive gear 31. A narrowed portion 32c is formed between the engaged groove 32a and the gear teeth 32b. A clutch yoke 39, which forms a part of the clutch control mechanism 19, is engaged with the narrowed portion 32c. The clutch yoke 39 is configured to be located in an off-position illustrated in FIGS. 6 and 7 when the clutch operating member 17 is located in a clutch-off position. On the other hand, the clutch yoke 39 is configured to be moved to an on-position located on the left side of the off-position in FIGS. 6 and 7 together with the pinion gear 32 when the clutch operating member 17 is located in a clutch-on position. Accordingly, the engaging pin 20 is engaged with the engaged groove 32a, and the clutch mechanism 13 is set to be in the clutch-on state. Therefore, the clutch mechanism 13 is formed by the engaging pin 20 and the pinion gear 32.

As illustrated in FIG. 7, the second gear 34 is coupled to a warm shaft 15a of the level winding mechanism 15 while being unitarily rotatable therewith.

Drag Mechanism

In the clutch-on state, the drag mechanism 21 is configured to brake the rotation of the spool 12 in the fishing-line releasing direction through the drive gear 31. The drag force of the drag mechanism 21 is regulated by the star drag 3. As illustrated in FIGS. 5 and 8, the rotation of the handle 2 and the pressing force of the star drag 3 are transmitted to the drag mechanism 21 through an inner race 40a of the one-way clutch 40. The drag mechanism 21 includes the drag plate 37 and the ratchet wheel 36. The drag plate 37 is coupled to the inner race 40a while being unitarily rotatable therewith. To make the drive gear 31 smoothly slide against adjacent members in drag activation, a first drag washer 41a is attached between the drag plate 37 and the drive gear 31, while a second drag washer 41b is attached between the drive gear 31 and the ratchet wheel 36. The first and second drag washers 41a and 41b are made of either felt or graphite.

Casting Control Mechanism

The casting control mechanism 22 includes a first friction plate 51a, a second friction plate 51b, and a brake cap 52. The first friction plate 51a and the second friction plate 51b are abutted to the both ends of the spool shaft 16 from the axially outside of the spool shaft 16. The brake cap 52 is a member configured to regulate the abutting pressure of the first friction plate 51a and the second friction plate 51b against the spool shaft 16. The first friction plate 51a is disposed inside the brake cap 52. The brake cap 52 is screwed onto the outer peripheral surface of the second boss 6d. The second friction plate 51b is mounted to the inside of the shaft support part 9.

Spool Brake Device

As illustrated in FIG. 7, the spool brake device 23 includes the rotary member 62, a plurality of (e.g., six) brake shoes 64, a brake drum 66, and a moving mechanism 68. The spool brake device 23 is mounted to the spool shaft 16 and the shaft support part 9. The plural brake shoes 64 are elastically engaged with the rotary member 62 while being pivotable and detachable. The brake drum 66 is disposed radially inwards of the brake shoes 64 and has an outer peripheral surface contactable with the pivotable brakes shoes 64. The moving mechanism 68 can move the brake shoes 64 and the brake drum 66 relatively to each other in the axial direction of the spool shaft 16, and can also position the brake shoes 64 and the brake drum 66 in the axial direction of the spool shaft 16.

The rotary member 62 is a roughly circular member made of synthetic resin (e.g., polyamide resin, polyacetal resin, etc.). The rotary member 62 is fixed onto the second serration 16c by press-fitting. The rotary member 62 is axially positioned by the brimmed portion 16b of the spool shaft 16. Further, the rotary member 62 is fixed to the spool shaft 16, and is configured to be rotated in conjunction with the rotation of the spool 12. When the spool 12 is rotated, each brake shoe 64 pivots about a pivot shaft 63c in the counterclockwise direction of FIG. 7 by centrifugal force. Then, the spool 12 is braked by friction to be produced between the brake shoes 64 and the brake drum 66. The braking force herein depends on the diameter of the brake drum 66 in the contact position. Therefore, the braking force can be regulated through the positional adjustment of the brake drum 66 by the moving mechanism 68. It should be noted that the operating member 60 is a member forming a part of the moving mechanism 68, and the position of the brake drum 66 can be adjusted by rotating the operating member 60.

Features

The aforementioned exemplary embodiment can be expressed as follows.

(1) The present dual-bearing reel is the one for forwardly reeling out the fishing line, and includes the reel unit 1, the spool 12, and the handle 2. The reel unit 1 includes the first and second main body parts 1a and 1b that the first lateral surface 1c and the third lateral surface 1d thereof are disposed opposite to each other at a predetermined interval. The spool 12 is disposed between the first main body part 1a and the second main body part 1b. The handle 2 is rotatably attached to the first main body part 1a on the second lateral surface 1e side opposed to the first lateral surface 1c of the first main body part 1a. The first main body part 1a has the recessed portion 1j extending along the first boundary portion 1h serving as a boundary portion between the attachment-side surface 1f and the first lateral surface 1c.

According to the above structure, the recessed portion 1j is formed on the first boundary portion 1h, i.e., a portion liable to interfere with the fingertips of the hand grasping the reel unit in palming. With the recessed portion 1j, it is possible to reduce chances that the first boundary portion 1h, which is a corner portion of the first main body part 1a, interferes with the fingertips. Therefore, the reel unit 1 can be easily grasped even when having the large-sized first main body part 1a.

(2) The recessed portion 1j is continuously extending along the first boundary portion 1h and the second boundary portion 1i serving as a boundary portion between the front surface 1g and the first lateral surface 1c in the first main body part 1a. In the structure, the recessed portion 1j is formed in a range from the first boundary portion 1h to the second boundary portion 1i. In other words, the recessed portion 1j is formed on the entirety of the portions contactable with the fingertips of the hand grasping the reel unit 1 in palming. Therefore, even when the position of the hand grasping the reel unit 1 is moved back and forth in palming, the fingertips more reliably make contact with the recessed portion 1j. Thus, with the recessed portion 1j, the reel unit 1a can be kept easily gasped.

(3) The recessed portion 1j has a roughly circular-arc shape in a cross-section taken along the direction perpendicular to the extending direction of the recessed portion 1j. In other words, the recessed portion 1j is shaped along the fingertips making contact therewith in palming. Therefore, better touch feeling can be obtained when the fingertips make contact with the recessed portion 1j. Accordingly, the reel unit 1 can be more easily grasped.

(4) The first main body part 1a includes the first side plate 5a and the first side cover 6a. The first side plate 5a has the first lateral surface 1c. The first side cover 6a has the second lateral surface 1e and is attached to the first side plate 5a. In the structure, the first main body part 1a is composed of at least two members including the first side plate 5a and the first side cover 6a. Therefore, replacement and maintenance can be performed for the respective components accommodated in the first main body part 1a by detaching the first side cover 6a from the first side plate 5a.

(5) The recessed portion 1j is formed on the first side plate 5a of the first main body part 1a. In the structure, the recessed portion 1j is formed on a single member (i.e., the first side plate 5a) without being formed across a plurality of members. Therefore, better touch feeling can be obtained when the fingertips make contact with the recessed portion 1j.

(6) The first main body part 1a accommodates the drive gear 31 mounted onto the drive shaft 30 that the handle 2 is also mounted thereon. Further, the recessed portion 1j is extending along a part of the outer circumference of the drive gear 31. In the structure, the recessed portion 1j is formed on the first main body part 1a along the outer circumference of the drive gear 31. Therefore, the size of the first main body part 1a can be reduced in appearance.

Modifications

An exemplary embodiment of the present invention has been explained above. However, the present invention is not limited to the aforementioned exemplary embodiment, and a variety of changes and modifications can be made without departing from the scope of the present invention. A plural exemplary embodiments and modifications described in the present specification can be arbitrarily combined on an as-needed basis.

Modification 1

In the aforementioned exemplary embodiment, as illustrated in FIGS. 1 and 4, the first main body part 1a has a protruding part 11 on the front surface 1g, and the protruding part 11 is forwardly protruding in a side view. Alternatively, the first main body part 1a can be without the protruding part 11. It should be noted that the protruding part 11 is formed by a part of the first side plate 5a and a part of the first side cover 6a. The first side cover 6a is fixed to the first side plate 5a at the protruding part 11 by a bolt 11a (an exemplary fastening member).

Figure 9:
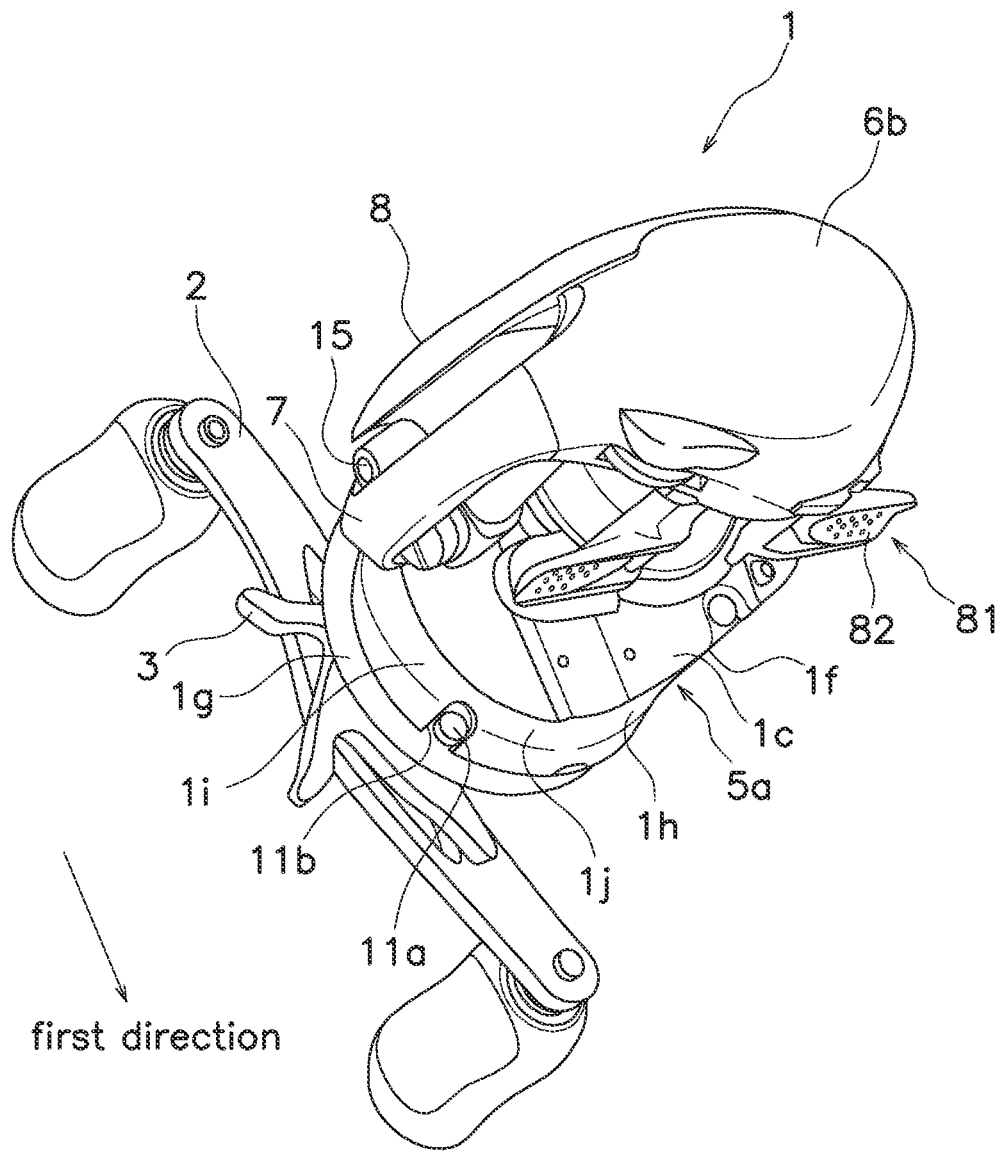
FIG. 9 is a perspective view of a dual-bearing reel according to a modification 1.

As illustrated in FIG. 9, a dual-bearing reel according to a modification 1 has a cut-out portion 11b on the front surface of the first side plate 5a. The cut-out portion 11b is formed for entirely accommodating a head portion of the bolt 11a in a side view. In the structure, the first side plate 5a accommodates the head portion of the bolt 11a in the cut-out portion 11b. Therefore, it is not required to form such a forwardly protruding part as described above. Thus, except for the cut-out portion 11b, the front surface 1g of the first main body part 1a, which is composed of the front surface of the first side plate 5a and that of the first side cover 6a, can be formed as a smoothly curved surface in a side view.

Further, in the modification 1, the bolt 11a is set in the same position as that in the aforementioned exemplary embodiment, and the front surface 1g of the first main body part 1a is further forwardly bulging than that in the aforementioned exemplary embodiment. Therefore, it is not required to form the protruding part 11 on the front surface 1g. Accordingly, enhanced design can be achieved without forming the protruding part 11. Further, it is possible to maintain strength required for attaching the first side plate 5a and the first side cover 6a to each other by maintaining the position that the first side plate 5a and the first side cover 6a are fixed by the bolt 11a.

In the modification 1, the first side plate 5a and the first side cover 6a are coupled by the bolt 11a on the front portion of the first main body part 1a. Further, the front surface 1g of the first main body part 1a is a smoothly curved surface bulging further forwards than the bolt 11a in a side view. In the structure, the front surface 1g of the first main body part 1a is a smoothly curved surface without any convex portion. Therefore, enhanced design can be achieved. Further, no change is made for the fixation position that the first side plate 5a and the first side cover 6a are fixed by the bolt 11a. Therefore, it is possible to maintain strength required for attaching the first side plate 5a and the first side cover 6a to each other.

Further, the first side plate 5a has the cut-out portion 11b on the front surface thereof in order to accommodate the bolt 11a therein in a side view. In the structure, the first side plate 5a accommodates the bolt 11a in the cutout portion 11b. Therefore, the first main body part 1a can be suppressed from forwardly bulging to the minimum. Accordingly, the dual-bearing reel can be compactly formed.

Modification 2

In the aforementioned exemplary embodiment, the recessed portion 1j is continuously formed along the first boundary portion 1h and the second boundary portion 1i. However, the present invention is not particularly limited to the structure. For example, the recessed portion 1j can be formed only on the first boundary portion 1h, or alternatively, can be intermittently formed along the first boundary portion 1h and the second boundary portion 1i. Yet alternatively, the recessed portion 1j cannot be formed on the entirety of the first boundary portion 1h, and thus can be formed only on a part of the first boundary portion 1h.

Modification 3

In the aforementioned exemplary embodiment, the recessed portion 1j is formed only on the first side plate 5a. However, the present invention is not particularly limited to the structure. For example, the recessed portion 1j can be formed across the first side plate 5a and the first side cover 6a.

ADVANTAGEOUS EFFECTS OF INVENTION

According to the present invention, a reel unit can be easily grasped in palming.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel being attachable to a fishing rod and configured to forwardly reel out a fishing line in a forward direction, comprising:
    a reel unit including a first main body part and a second main body part, the first main body part including a first lateral surface and a front surface facing in the forward direction, a second lateral surface being opposite to the first lateral surface, and an attachment-side surface, the second main body part including a third lateral surface facing the first lateral surface at a predetermined interval;
    a spool being disposed between the first main body part and the second main body part;
    a handle being rotatably attached to the first main body part on the second lateral surface; and
    an attaching member including an attaching surface facing a first direction, the attaching surface contacting the fishing rod when the dual-bearing reel is attached to the fishing rod;
    the first main body part including a recessed portion extending continuously along a first boundary portion and a second boundary portion, the first boundary portion being between the attachment-side surface and the first lateral surface, the attachment-side surface facing the first direction, and the second boundary portion being between the front surface and the first lateral surface.

2. The dual-bearing reel according to claim 1, wherein the recessed portion includes a circular-arc shape in a cross-section thereof when the recessed portion is viewed in a direction perpendicular to a direction in which the recessed portion extends.

3. The dual-bearing reel according to claim 2, wherein the recessed portion has a radius of curvature greater than or equal to 3 mm and less than or equal to 15 mm.

4. The dual-bearing reel according to claim 1, wherein the first main body part includes a side plate and a side cover,
    the first lateral surface is located at the side plate,
    the second lateral surface is located at the side cover, and
    the side cover is attached to the side plate.

5. The dual-bearing reel according to claim 4, wherein the recessed portion is formed on the side plate.

6. The dual-bearing reel according to claim 4, wherein
the first main body part is assembled by coupling the side plate and the side cover by a fastening member on a front portion thereof, and
the front surface of the first main body part is a smoothly curved surface bulging further forwards than the fastening member in a side view.

7. The dual-bearing reel according to claim 6, wherein
the side plate includes a cut-out portion on a front surface thereof, and
the cut-out portion accommodates the fastening member in a side view.

8. The dual-bearing reel according to claim 1, further comprising
a drive shaft; and
a drive gear, wherein
the first main body part accommodates the drive gear to be mounted onto the drive shaft to which the handle is attached, and
the recessed portion extends along a part of an outer circumference of the drive gear.

\* \* \* \* \*